(12) United States Patent
Kincaid et al.

(10) Patent No.: US 6,622,565 B2
(45) Date of Patent: Sep. 23, 2003

(54) FLUID PRESSURE MEASUREMENT BY MECHANICAL COMPRESSION OF TUBING

(75) Inventors: Dennis C. Kincaid, Hansen, ID (US); Thomas J. Trout, Clovis, CA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 10/060,467

(22) Filed: Jan. 29, 2002

(65) Prior Publication Data

US 2003/0140705 A1 Jul. 31, 2003

(51) Int. Cl.[7] .................................................. G01L 7/10
(52) U.S. Cl. ........................... 73/730; 239/542; 73/720; 73/753
(58) Field of Search ........................... 73/730, 119, 753, 73/726, 724, 754, 723, 700, 720; 338/4, 5; 310/328, 338; 600/488, 561, 486; 604/153

(56) References Cited

U.S. PATENT DOCUMENTS

| 3,880,008 | A | * | 4/1975 | Eilersen | 73/398 |
| 4,194,401 | A | * | 3/1980 | Claassen et al. | 73/730 |
| 4,290,311 | A | | 9/1981 | Brewer | |
| 4,321,833 | A | * | 3/1982 | Ziringer | 73/730 |
| 4,391,147 | A | * | 7/1983 | Krempl et al. | 73/730 |
| 4,807,479 | A | * | 2/1989 | Sako et al. | |
| 5,031,460 | A | * | 7/1991 | Kanaenobu et al. | 73/730 |
| 5,505,092 | A | | 4/1996 | Kowalski | |
| 5,509,449 | A | | 4/1996 | Kincaid | |
| 6,070,470 | A | * | 6/2000 | Harms et al. | 73/730 |
| 6,171,253 | B1 | * | 1/2001 | Bullister et al. | 600/486 |
| 6,250,164 | B1 | * | 6/2001 | O'Brien et al. | 73/730 |

* cited by examiner

*Primary Examiner*—Andrew H. Hirshfeld
*Assistant Examiner*—Marissa Ferguson
(74) *Attorney, Agent, or Firm*—Margaret A. Connor; David R. Nicholson; John Fado (57) ABSTRACT

The invention provides a simple, non-invasive means for measuring pressure of fluid in fluid-containing, resilient tubing by measuring the force to mechanically compress the tubing to a predetermined distance. In the apparatus of the invention, first and second opposed members are moved together to a predetermined distance to compress the fluid-containing, resilient tubing therebetween. Measuring means connected to at least one of the members is used to measure the force exerted by the fluid-containing, resilient tubing against the members when the members are at the predetermined distance from one another, wherein the measuring means has been pre-calibrated at the predetermined distance, to correspond to fluid pressure within the fluid-containing, resilient tubing. An important application of the invention is the provision of a convenient, non-intrusive, low-cost device for field measurement of pressure in drip irrigation systems, without installing special fittings or puncturing the tubing.

13 Claims, 9 Drawing Sheets

FLUID PRESSURE MEASUREMENT BY MECHANICAL COMPRESSION OF TUBING

BACKGROUND OF THE INVENTION

1. Field of the Invention

The present invention relates to measurement of fluid pressure in fluid-containing, resilient tubing. In particular, the invention relates to a simple, non-invasive means for fluid pressure measurement in fluid-containing, resilient tubing by measuring the force exerted by the fluid-containing, resilient tubing when the tubing is mechanically compressed. The invention is particularly useful for field measurement of fluid pressure in drip irrigation systems.

2. Description of the Art

Microirrigation is increasing worldwide as a means of improving irrigation efficiency. Micro or drip irrigation systems can be adapted to hilly terrain and a wide variety of soils and crops. The emitting hose can be buried or laid on the soil surface. Most field crop drip systems use thin walled (4–15 mil), collapsible polyethylene tubing or drip "tape" with integral emitters. Tubing is manufactured in several diameters, with 16 mm (⅝ inch) diameter being the most popular (Hanson, et al., "Drip irrigation of row crops: What is the state of the art?" IN: *National Irrigation Symposium—Proceedings of the 4$^{th}$ Decennial Symposium*, Nov. 14–16, 2000, Phoenix, Ariz.). Emitters are usually tortuous-path and uniformly spaced such that the tubing emits a "nominal" discharge per unit length of tubing when the pressure is maintained within desired limits. Typical drip tube pressures range from 34–138 kPa (5–20 psi), and pressures of 55–83 kPa (8–12 psi) are commonly used. The length of lateral is limited by the pressure loss and elevation variation. Pressure levels and variations in drip systems must be known to assess water distribution uniformity. Allowable pressure variations depend on the design uniformity (ASAE Standard EP 405.1, "Design and Installation of Microirrigation Systems" *ASAE Standards* 2000, American Society of Agricultural Engineers, St. Joseph, Mich.), but typically the pressure in a lateral should not vary by more than 20 percent. Unlike sprinkler nozzles, drip emitter pressure cannot be easily measured with a pitot-tube type insertion gage. Irrigators sometimes assess pressure by squeezing the tubing with their fingers. There is a need for a convenient, low-cost means to measure the pressure in drip tubing in the field, without disturbing or puncturing the tube.

SUMMARY OF THE INVENTION

The present invention is directed to a means for measuring pressure of fluid in fluid-containing, resilient tubing by measuring the force to mechanically compress the tubing to a predetermined distance.

More particularly, the means for measuring pressure of fluid in fluid-containing, resilient tubing comprises:

(a) first and second opposed members for receiving fluid-containing, resilient tubing therebetween;

(b) means for moving at least one of the members towards the other to a predetermined distance therebetween, to compress the fluid-containing, resilient tubing; and (c) means connected to at least one of the members to measure the force exerted by the fluid-containing, resilient tubing against the members when the members are at the predetermined distance from one another; wherein the measuring means has been pre-calibrated at the predetermined distance, to correspond to fluid pressure within the fluid-containing, resilient tubing.

The invention provides a simple, non-invasive means for measuring fluid pressure in fluid-containing, resilient tubing. As shown in an exemplified embodiment, the invention senses pressure by compressing a section of fluid-containing, resilient tubing between two plates to a standard, repeatable percentage of its original diameter. The device can use any means to measure the force on the plates, such an electronic load cell or a simple compression spring. The measurement of the force on the plates corresponds to pressure units of fluid pressure exerted on the plates as pre-determined by a calibration equation or calibrated scale.

The invention is also directed to methods of using the apparatus of the invention.

The method of the invention for measuring pressure in fluid-containing, resilient tubing, comprises:

(a) compressing a section of fluid-containing resilient tubing between first and second opposed members to a predetermined distance, and (b) measuring the force exerted by the fluid-containing, resilient tubing against the members when the members are at the predetermined distance from one another; wherein the measuring means has been pre-calibrated, at the predetermined distance, to correspond to fluid pressure within the tubing.

An important application of the invention is for field measurement of fluid pressure in drip irrigation systems. Drip irrigation using thin-walled plastic drip tape with integral emitters is increasing worldwide as a means of improving irrigation water use efficiency. Irrigation uniformity depends on maintaining pressure in drip laterals within acceptable limits. Typical drip tube pressures range from 34–138 kPa (5–20 psi), and a common tube diameter is 16 mm. To date, there has been no easy method of measuring the internal pressure in drip tubing in the field without puncturing the tube or installing special fittings. The invention provides a low-cost means for fluid measurement in drip irrigation systems and is suitable for field use. As demonstrated in the Example, below, it can measure pressure within about 5 percent accuracy.

Accordingly, it is an object of the invention to provide a convenient, non-intrusive and low cost means for irrigators to assess pressure variations within irrigation systems, e.g., microirrigation laterals, without installing special fittings or puncturing the tubing.

Most drip tubing in the field is buried from 2 to 40 cm. Shallow buried tubing is easily exposed for testing. Even when placed under plastic mulch, the tubing is often exposed at the upstream and downstream ends. Deeply buried tubing would need to be exposed by digging a hole. In either case, this non-intrusive pressure measurement is preferable to punching and repairing a hole in the tubing for direct pressure measurement.

Other objects and advantages of the invention will become readily apparent from the ensuing description.

DETAILED DESCRIPTION OF THE INVENTION

Unless defined otherwise, all technical and scientific terms used herein have the meaning commonly understood by a person skilled in the art to which this invention belongs.

In its broadest ambit, the apparatus of the invention for measuring pressure of fluid in fluid-containing, resilient tubing comprises:

(a) first and second opposed members for receiving fluid-containing, resilient tubing therebetween;

(b) means for moving at least one of the members towards the other to a predetermined distance therebetween, to compress the fluid-containing, resilient tubing;

(c) means connected to at least one of the members to measure the force exerted by the fluid-containing, resilient tubing against the members when the members are at the predetermined distance from one another; wherein the measuring means has been pre-calibrated, at the predetermined distance, to correspond to fluid pressure within the fluid-containing, resilient tubing.

The method of the invention for measuring pressure in fluid-containing, resilient tubing, comprises:

(a) compressing a section of fluid-containing, resilient tubing between first and second opposed members to a predetermined distance, and (b) measuring the force exerted by the tubing against the members when the members are at the predetermined distance from one another; wherein the measuring means has been pre-calibrated, at the predetermined distance, to correspond to fluid pressure within the tubing.

Exemplary embodiments of the present invention are next described with reference to the drawings. In the embodiment shown in FIGS. 1–6, the apparatus of the present invention is illustrated wherein a spring balance is used to measure the force exerted by the fluid-containing, resilient tubing upon the first and second members when the members are at the predetermined distance from one another. In the embodiment shown in FIG. 7, the apparatus of the invention is illustrated wherein a force transducer (load cell) is used to measure the force exerted by the fluid-containing, resilient tubing upon the first and second members when the members are at the predetermined distance from one another. The embodiments shown in FIGS. 1–5 and 7 illustrate the apparatus of the invention wherein the first and second members are moved to the predetermined distance via pivot means. The embodiment shown in FIG. 6 illustrates the apparatus of the invention wherein the first and second members are moved linearly towards one another by means of a slide mechanism under the force of a compression spring.

Figure 1:
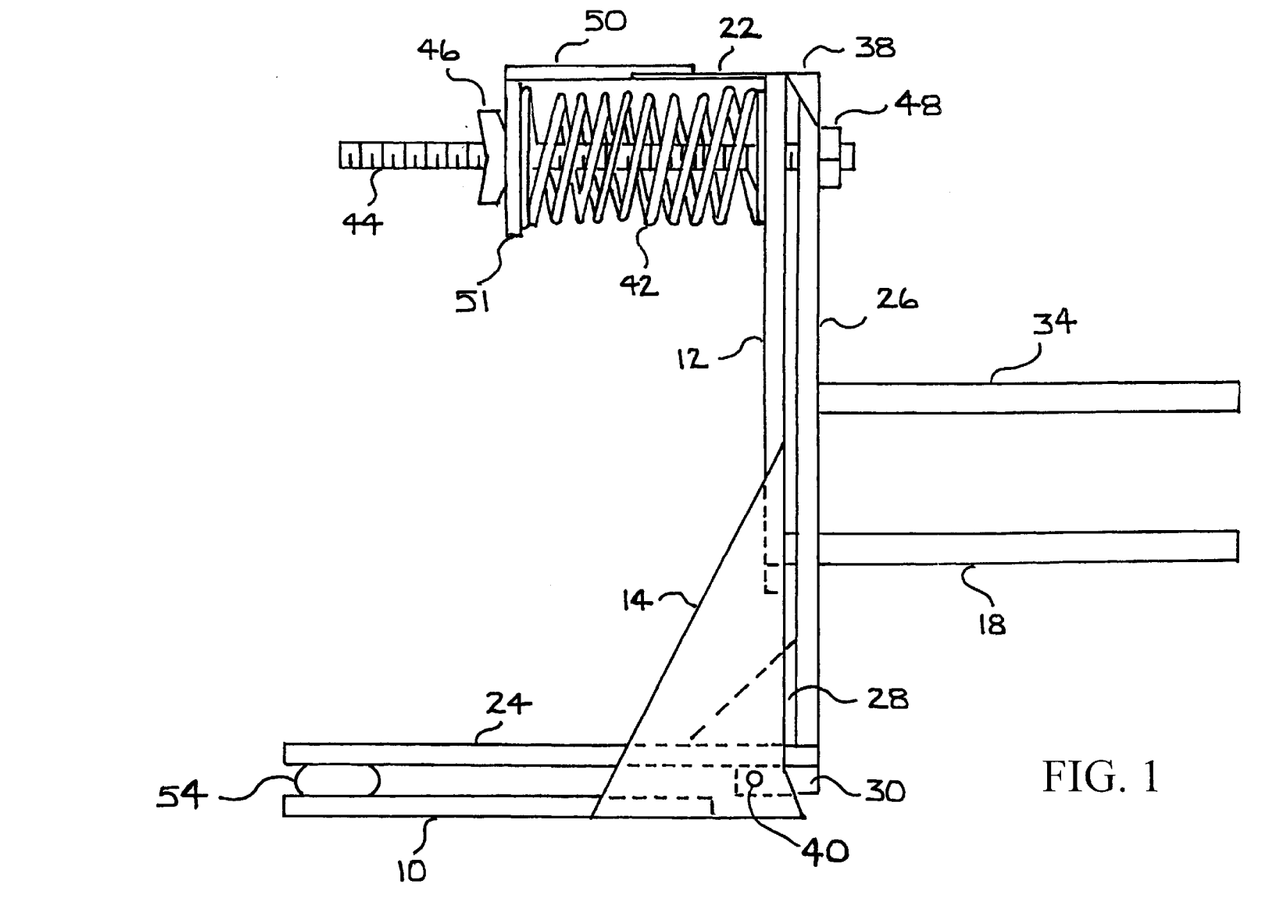
FIG. 1 is a side view of the apparatus of the invention wherein a compression spring is used for applying a resistance force effective for moving the first and second members towards on e another.
Figure 2:
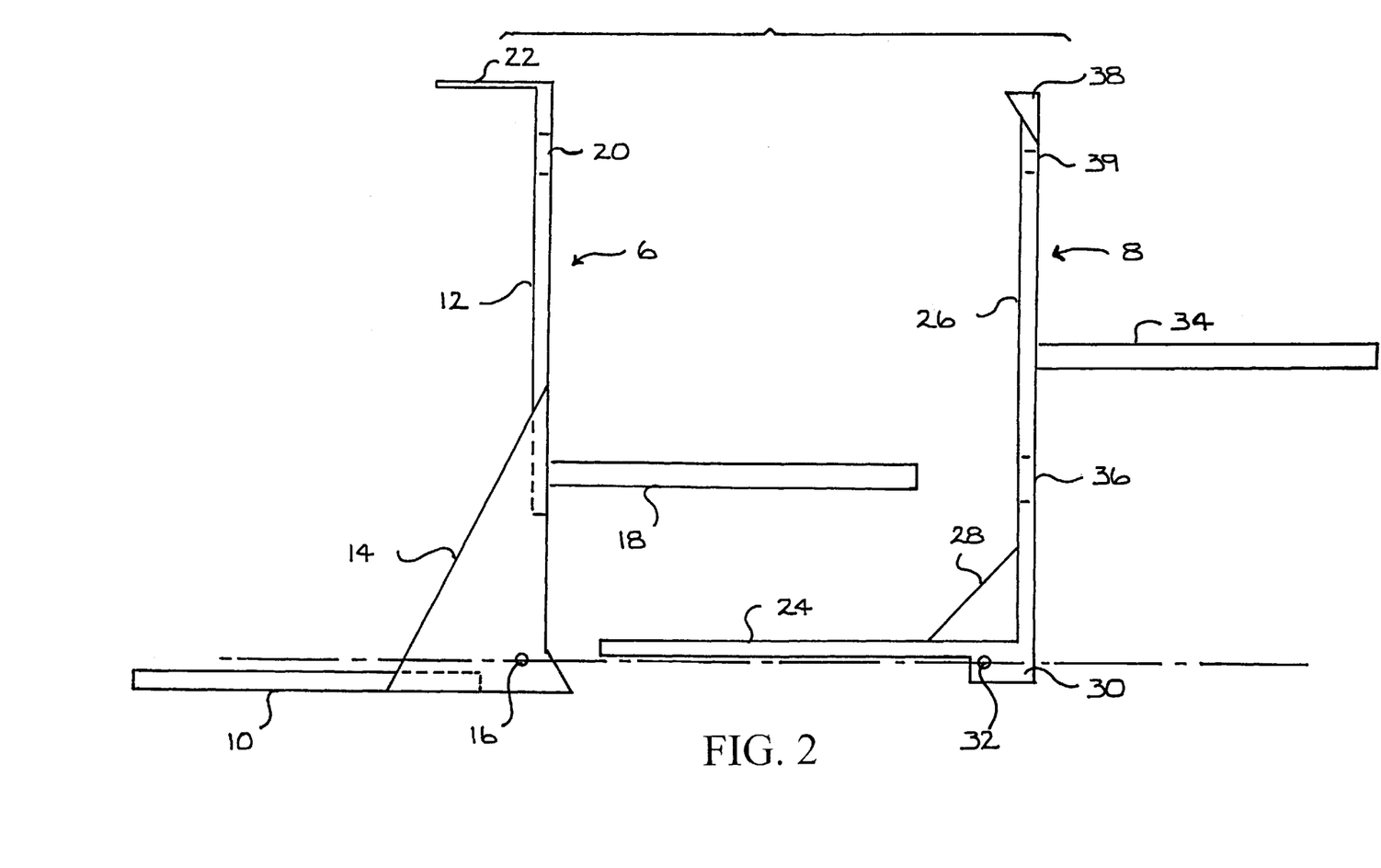
FIG. 2 is an exploded side view showing the upper and lower plate assemblies of the embodiment shown in FIG. 1.

The apparatus as shown in FIGS. 1–5 includes a lower plate assembly (6) and upper plate assembly (8) which are pivotally connected. As shown in FIG. 2 (exploded side view) and FIG. 3A (end view), the lower plate assembly comprises lower plate 10, lever plate 12 which is located at a right angle to lower plate 10 and displaced therefrom, gusset plate 14 which is rigidly attached to lower plate 10 and to lever plate 12 to form an ell-shaped assembly and to bridge lower plate 10 and lever plate 12 and create an opening for insertion of the upper plate assembly. Gusset plate 14 has hole 16 for insertion of a pivot pin, and lever plate 12 has circular through hole 20 for free passage of threaded rod 44, as discussed in detail, below. The lower plate assembly further includes lever rod 18 which is rigidly attached to lever plate 12, and pointer 22, described in detail below, which is affixed to the top of lever plate 12. Lower plate 10, lever plate 12, gusset plate 14, and lever rod 18 are made of a durable material, for example, steel, aluminum or brass bar stock, and ell-shaped unit comprising lower plate 10, lever plate 12, gusset plate 14, pointer 22, and optionally lever rod 18 may be fabricated as a single unit. Lower plate 10 has a substantially planar upper surface (inner surface relative to upper plate 24), and upper plate 24 has a substantially planar lower surface (inner surface relative to lower plate 10). For the purposes of this invention, the term "substantially planar" means that the inner surfaces of the plates are generally flat, however, small bumps or other surface irregularities are acceptable as long as they do not interfere with achieving the predetermined distance and do not interfere with calibration of the measuring means.

Figure 3A:
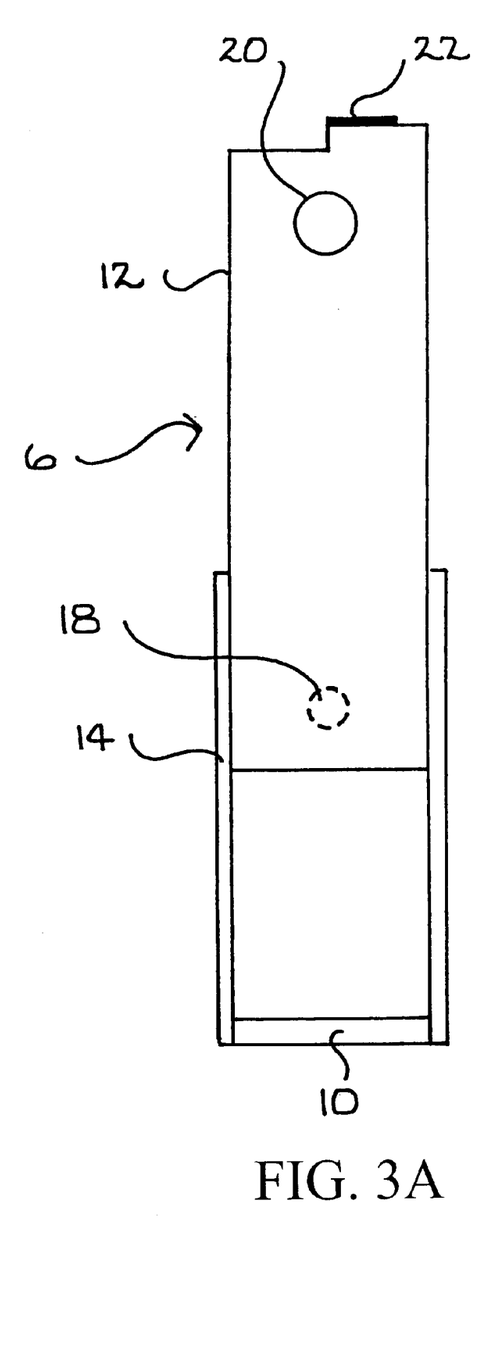
FIGS. 3A and 3B are end views of the lower plate assembly and upper plate assembly, respectively, of the embodiment shown in FIG. 1.
Figure 3B:
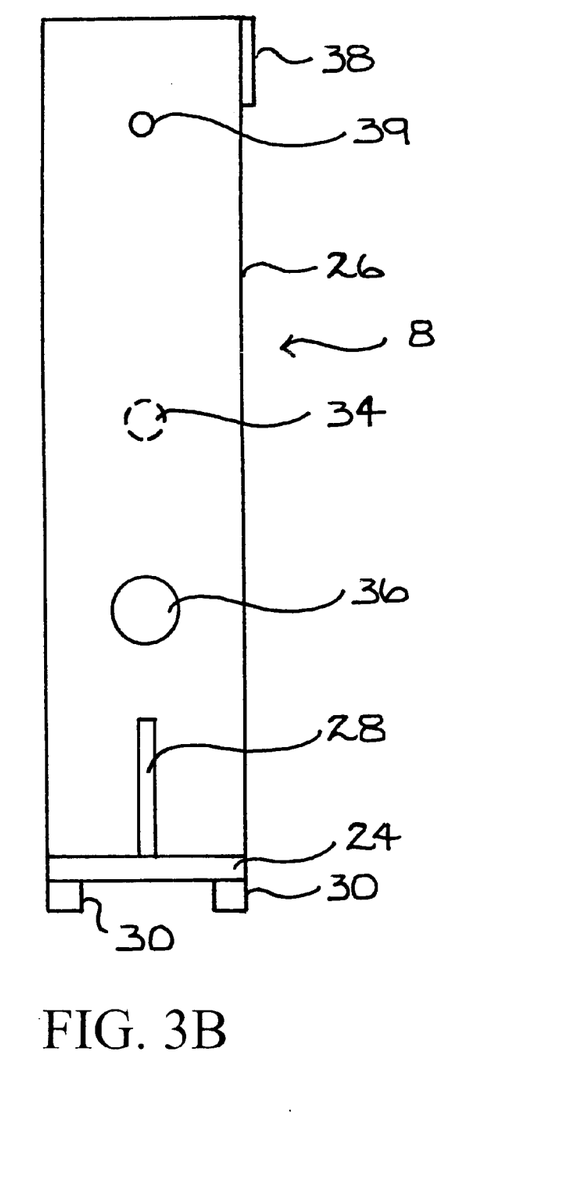
Figure 5:
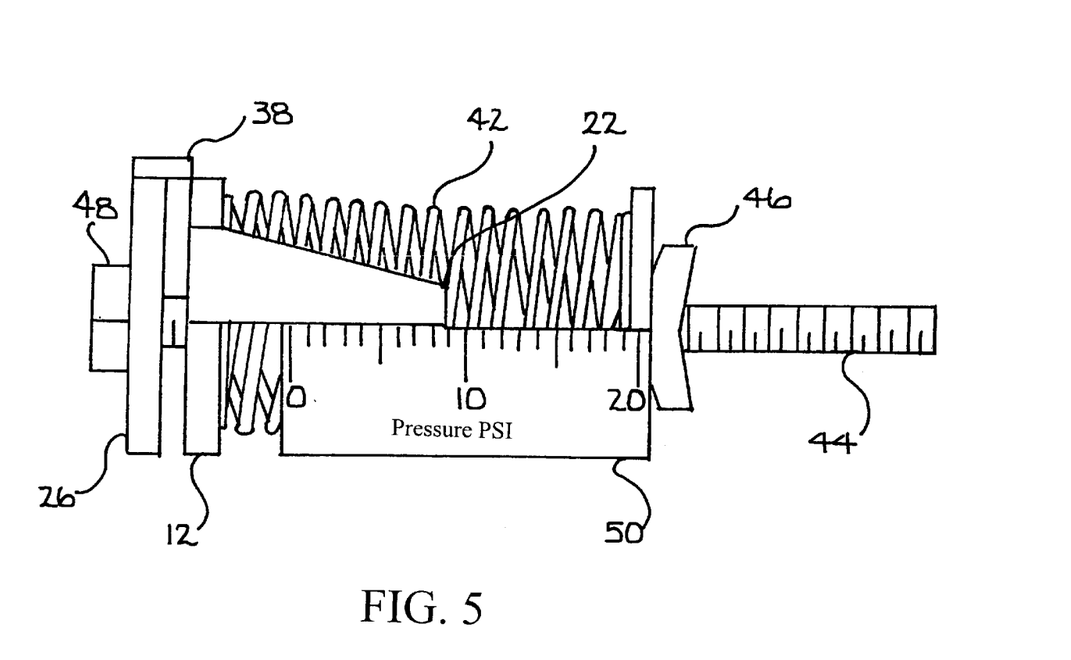
FIG. 5 is a top view of the spring and pressure scale of the embodiment of FIG. 1.

The upper plate assembly shown in FIG. 2 (exploded side view) and FIG. 3B (end view) comprises upper plate 24, lever plate 26 which is located at a right angle to upper plate 24 and affixed thereto to form an ell-shaped assembly, gusset plate 28 rigidly affixed to upper plate 24 and lever plate 26 at the angle, and pivot bearings 30 located at the angle and having holes 32 for insertion of a pivot pin. Lever plate 26 has circular though hole 36 for free passage of lever rod 18 attached to the lower plate assembly and hole 39 tapped for threaded rod 44. The upper plate assembly further includes lever rod 34 which is rigidly attached to lever plate 26, and alignment indicator 38 which is attached to the uppermost portion of lever plate 26 so that the point of indicator 38 is aligned with one side of the plate 12 as shown in FIG. 5 when upper plate 24 and lower plate 10 are parallel. Upper plate 24, lever plate 26, gusset plate 28, and lever rod 34 are made of a durable material, preferably the same as the lower plate assembly, and the ell-shaped unit comprising upper plate 24, lever plate 26, gusset plate 28, pivot bearings 30, alignment indicator 38, and optionally lever rod 34 may be fabricated as a single unit.

Figure 4:
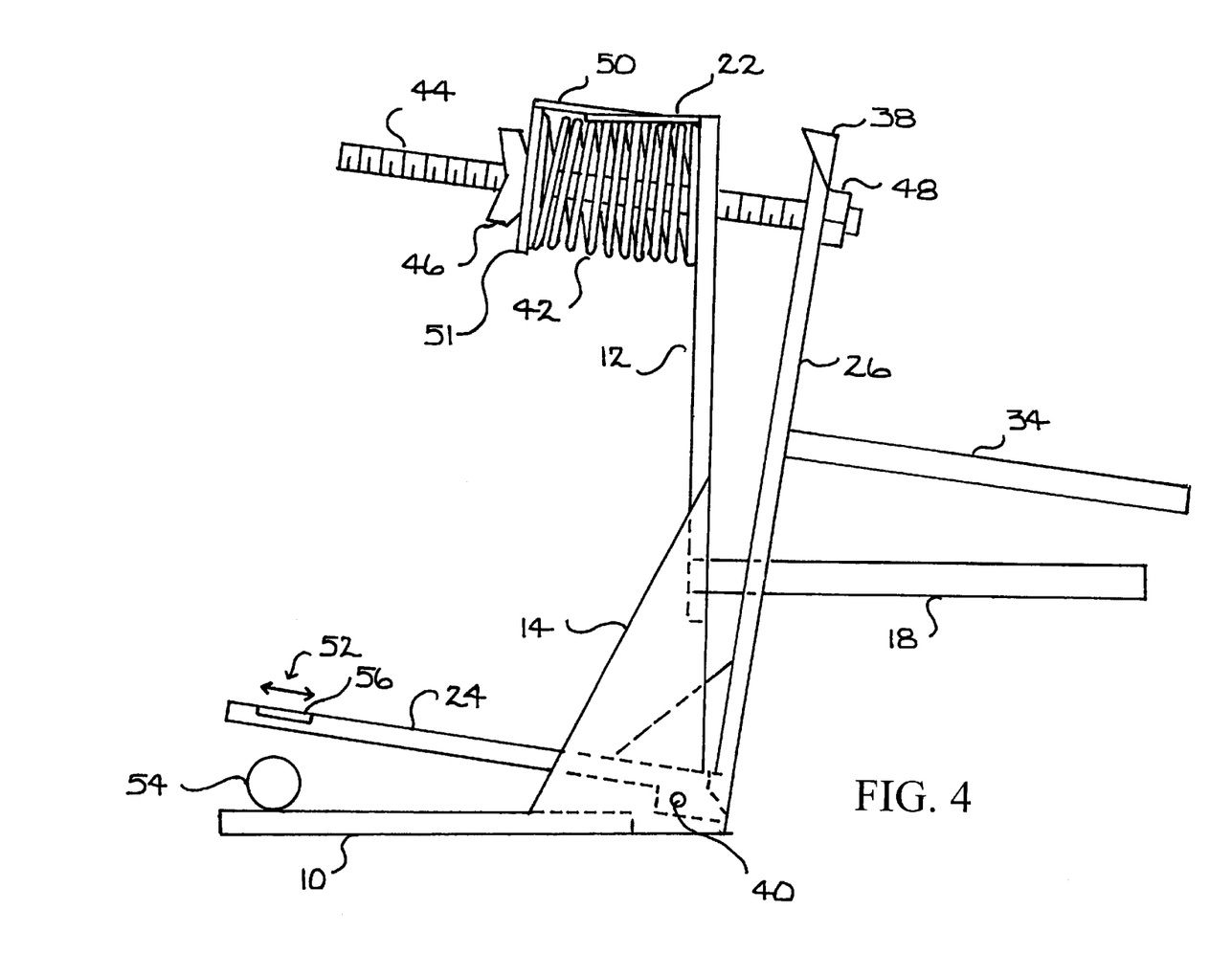
FIG. 4 is a side view of the apparatus of FIG. 1 wherein the first and second members are in the open position.

The upper and lower plate assemblies are connected together as shown in FIG. 1 and FIG. 4 via transverse pivot pin 40 through holes 16 in gusset 14 and holes 32 in pivot bearings 30. Threaded rod 44 is positioned through circular through hole 20 in lever plate 12 and rigidly attached to lever plate 26 with lock nut 48. Compression spring 42 is positioned about threaded rod 44. Wingnut 6 on threaded rod 44 is used to adjust the spring length. Pre-calibrated scale 50 is positioned adjacent to spring 42 via bracket 51 and adjacent to pointer 22. Wingnut 46 on threaded rod 44 is used to adjust the length of spring 42 and thus adjust the spring force, until the desired alignment of the upper and lower plates is obtained. In the preferred embodiment, the alignment is adjusted until the alignment indicator (38) indicates that the plates are parallel (as shown in FIG. 5). The fluid pressure is read directly from calibrated scale 50 by use of pointer 22.

In use, the user manually squeezes levers rods 18 and 34 together. This first applied force causes the upper and lower plate assemblies to pivot about pivot pin 3 and displace upper plate 24 and lower plate 10 relative to one another to open a space therebetween to receive fluid-containing, resilient tubing (54) as shown in FIG. 4. A section of the fluid-containing, resilient tubing whose fluid pressure is to be measured is placed between the upper and lower plates. In a preferred embodiment, the tubing is placed substantially in the same position between the plates each time, for example, in an alignment zone (52) on the upper plate, designated in FIG. 4 by the double arrow and as shown as alignment zone indicator 56 on plate 24. Preferably, the alignment zone is as wide as the uncompressed tubing as shown in FIG. 4, and the tubing is aligned prior to compression. In a more preferred embodiment, the tubing is placed substantially in the same position between the plates during use as the calibration tubing was placed when the measuring means of the apparatus was calibrated.

Figure 6A:
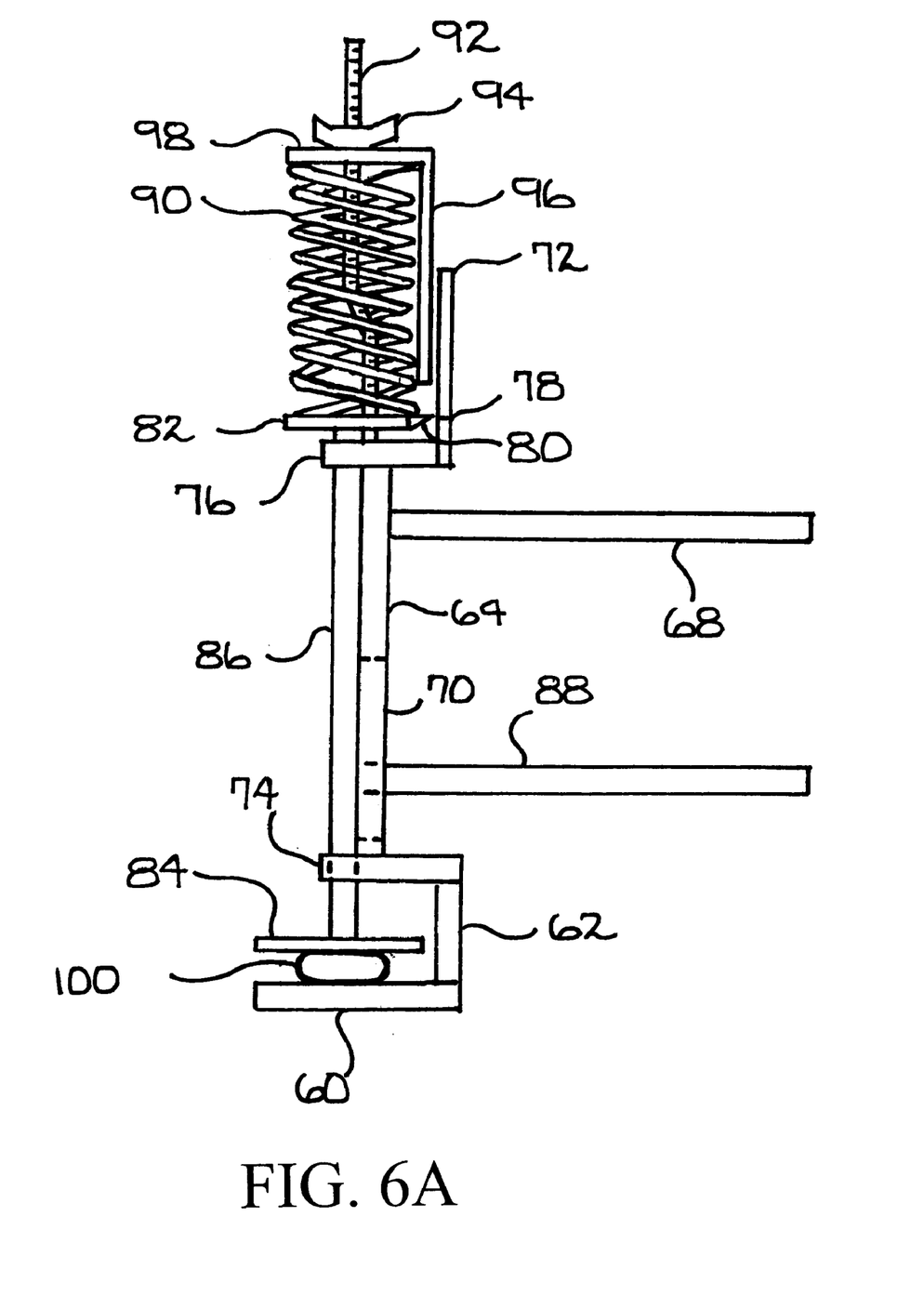
FIG. 6A is a side view of another embodiment of the invention wherein the first and second members are moved linearly towards one another by means of a slide mechanism under the force of the compression spring.
Figure 6B:
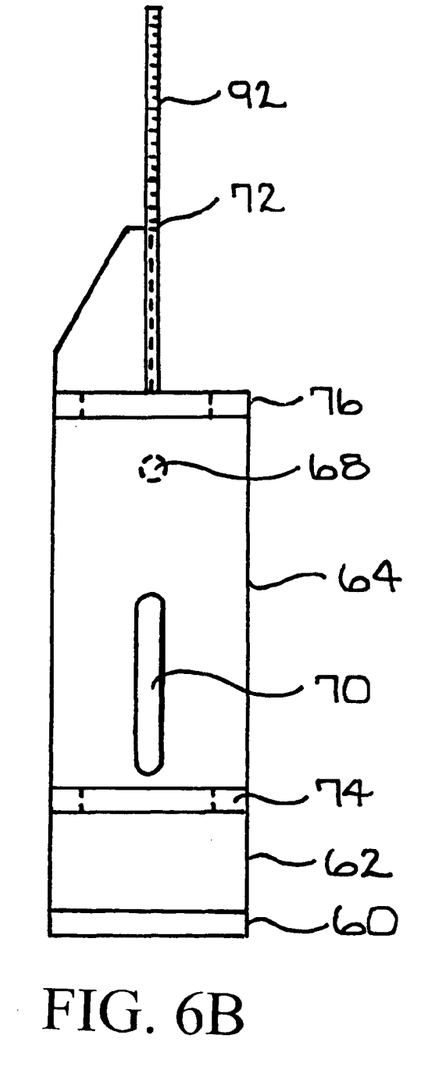
FIGS. 6B and 6C are end views of the lower plate assembly and upper plate assembly, respectively, of the embodiment shown in FIG. 6A.
Figure 6C:
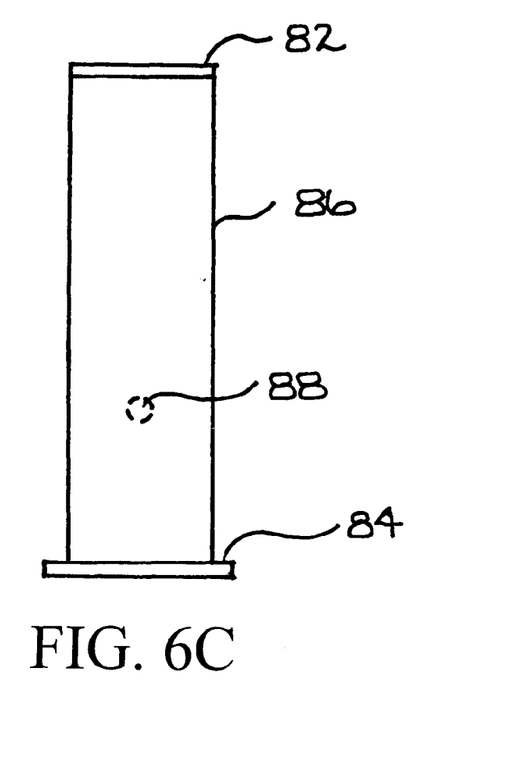
Figure 6D:
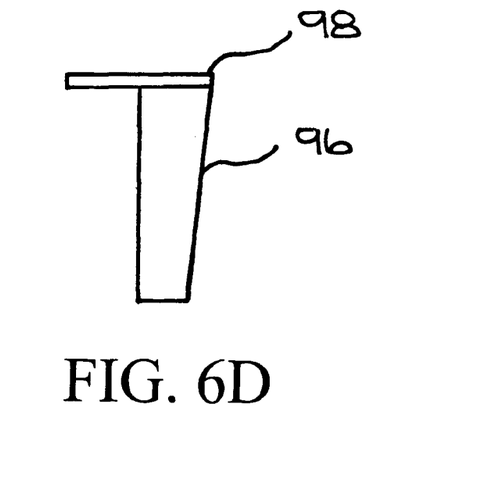
FIG. 6D in an end view showing the scale assembly.
Figures 7A, 7B, 7C:
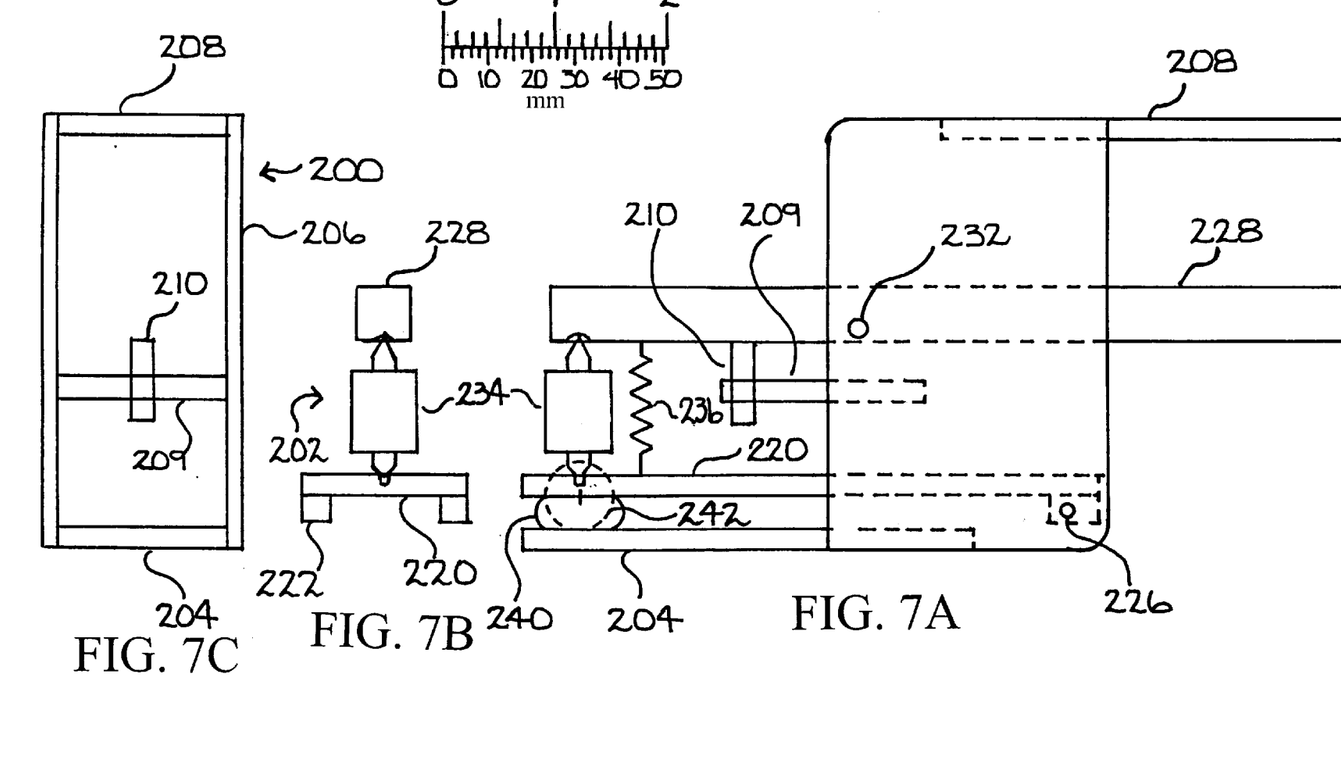
FIG. 7A is a side view of the apparatus of the invention wherein an electronic force transducer is used to measure the force on the first and second members.
FIGS. 7B and 7C are end views of the lower plate assembly and upper plate assembly, respectively, of the embodiment shown in FIG. 7A.

Next, upper plate 24 is moved towards lower plate 10 and adjusted to the predetermined distance therebetween as follows. The user releases the pressure on lever rods 18 and 34, and the resistance force of compression spring 42 causes upper plate 24 to move towards lower plate 10, compressing the fluid-containing, resilient tubing (54) therebetween. The plates are then brought into parallel alignment by adjusting wingnut 46 on threaded rod 44 to adjust the spring length and thus the spring force until the alignment pointer 22 is in the position where the plates are parallel as shown in FIG. 1. When the alignment indicator is lined up as shown in FIG. 5, the plates are parallel with each other, the force exerted by the fluid-containing, resilient tubing upon the plates, is balanced by spring 42, and the pressure can be read from the scale 50 at the pointer (22) position. While it is preferable that the plates be parallel, this is not critical if the distance is consistent during the reading of the scale. The important thing is that the measurement is repeatable. For purposes of this invention, the phrase "compress the fluid-containing, resilient tubing" means that the tubing is pressed or squeezed or partially flattened as shown in FIGS. 1, 6, 7 (tube indicated by solid circle), and 8, without excessive flow restriction, as discussed, below, in the Principles and Design section.

The pressure in the tubing is translated to force through the walls of the fluid-containing, resilient tubing acting on the plates. The spring provides the force; the length of the spring determines the force. When the tubing is compressed between the plates, a surface area is created on the plates, and the pressure in the tube then creates a force on the plates. As discussed, below, in the "Principles and Design" section, the compression of the tubing at the point of compression will create a slight pressure loss, but as discussed in the "Principles and Design" section, this can be made negligible.

The upper and lower limits of compression of the tubing for any particular application depends on the range of flow in the tubing, the range of pressures, and the desired accuracy. One of skill in the art can determine these limits for any particular application by routine experimentation. For irrigation applications as discussed in the Example section, below, the compression range is about 10% to 80% and preferably 30% to 50%. The optimum compression for this application is about 50%.

The force exerted by the fluid-containing, resilient tubing against the plates when the plates are at the predetermined distance from one another is read directly from the calibrated scale 50 by use of pointer 22. This measuring means has been pre-calibrated, as discussed below, to correspond to fluid pressure within the tubing. Normally, only small adjustments in spring length are needed between successive readings.

FIGS. 6A–D show another embodiment of the invention wherein a compression spring is used for applying a resistance force effective for moving the first and second members towards one another. In this embodiment, a linear slide mechanism controls the upper plate movement relative to the lower plate. The lower plate assembly (FIG. 6B) is comprised of a fixed bar 64, slide bearing 74, lower plate bracket 62, lower plate 60, upper slide bearing 76, pointer 72, threaded rod 92, and handle 68. The fixed bar contains slot opening 70 which allows free movement of handle 88. The slide bearings 74 and 76 contain rectangular holes slightly larger than the cross section of sliding bar 86, allowing free movement of the upper plate assembly relative to the lower plate assembly.

The moveable upper plate assembly (FIG. 6C) is comprised of sliding bar 86, upper plate 84, spring plate 82 and handle 88. Scale assembly (FIG. 6D) is comprised of scale 96 and scale bracket 98. As with the previously described embodiment, the inner surfaces of the upper and lower plates are substantially planar. Compression spring 90 contacts spring plate 82 and scale bracket 98. Scale bracket 98 is also attached to scale 96 at right angles. Threaded rod 92 positions bracket 98 and the upper end of spring 90. Pre-calibrated scale 96 is positioned adjacent to spring 90 via bracket 98 and adjacent to pointer 72. Wingnut 94 on threaded rod 92 is used to adjust the length of spring 90 and thus adjust the spring force, until the desired distance between the upper and lower plates is obtained. In the preferred embodiment, wingnut 94 is adjusted until the alignment indicator (80) is adjacent to the alignment mark 78, indicating that the desired distance has been obtained. The fluid pressure is read directly from calibrated scale 96 by use of pointer 72.

In use, the user manually displaces handle 88 (which moves in groove 70) toward handle 68 thus moving the upper plate assembly upward. This first applied force causes the moveable upper plate assembly to move upward relative to the fixed lower plate assembly and thereby displace upper plate 84 relative to lower plate 60 to open a space therebetween to receive fluid-containing, resilient tubing (100). A section of the fluid-containing, resilient tubing whose fluid pressure is to be measured is placed between the upper and lower plates. In a preferred embodiment, the tubing is placed substantially in the same position between the plates each time, as near as possible to the center of the upper plate 84. In this preferred embodiment, the tubing is also placed substantially in this same position between the plates when the measuring means of the apparatus is calibrated.

The user releases the pressure on handles 68 and 88, and the resistance force of compression spring 90 causes upper plate 84 to move towards lower plate 64 and compresses the fluid-containing, resilient tubing (100) therebetween. The user then adjusts the wingnut 94 on threaded rod 92 until the pre-determined plate spacing is achieved as indicated by the alignment indicator 80 being in line with the alignment mark 78. This alignment procedure achieves the consistent, pre-determined tube compression as described above for the embodiment of FIGS. 1–5. The force exerted by the fluid-containing, resilient tubing upon the plates, is balanced by spring 90. The pressure within the fluid-containing, resilient tubing is read directly from the pre-calibrated scale 96 by use of pointer 72.

In another embodiment shown in FIGS. 7A–C, the apparatus of the invention uses an electronic force transducer (load cell, 234) to measure the force on plates 204 and 220 exerted by fluid-containing, resilient tubing. The lower plate assembly (200) includes lower plate 204, side plates 206, upper lever 208, stop mount 209, and stop 210. The upper plate assembly (202) includes upper plate 220, pivot bearings 222, lever 228, and load cell 234. Upper plate 220 freely pivots about pivot pin 226, which is through holes in the pivot bearings (222) of the upper plate assembly and adjacent holes in the side plate (206) of the lower plate assembly. A lever 228, pivoted about pivot 232, is used to force the load cell and thus the upper plate 220 downward until lever 228 contacts the adjustable stop 210 (a small threaded rod), at which the plates are parallel and at the proper distance. The upper lever 208 is manually squeezed together with lever 228 to provide the force. The load cell readout is pre-calibrated to display the fluid pressure within the tube. The small spring 236 is used to raise plate 220 for insertion of the fluid-containing, resilient tubing, and keeps the load cell in place, but has negligible effect on the force.

In use, the upper and lower plates are displaced relative to one another by rotating the pivoting lever 228 (clockwise in FIG. 7A) to raise the upper plate while the tube is positioned between the plates. Next, the user squeezes, levers 208 and 228 together, wherein the upper plate is forced downward by the load cell until the pivoting lever contacts a preset stop, where the plates are at a predetermined distance and preferably parallel. The calibrated load cell output embodiment then displays a reading of the fluid pressure in the fluid-containing, resilient tubing in the appropriate units, e.g., psi.

The invention can be readily adapted by one of skill in the art to accommodate a wide range of tubing diameters and pressure ranges. When the tubing is compressed between the two plates or surfaces, a portion of the force required is due to the resistance of the tube wall itself to bending, and the remainder of the force is due to the static pressure of the fluid within the tube. The calibration procedure takes into account any effect of the tubing material on the pressure measurement. The apparatus pressure measurement method will be most effective when the fluid pressure force is relatively large compared to the tube wall bending force. This occurs in many fluid conveyance applications where the minimum tube wall thickness and strength is specified to handle the maximum expected pressure, and where tube flexibility is required. The method would not be applicable where the tube would be damaged or not return to its original shape after compression under the normal fluid pressure.

Calibration of the embodiments is accomplished by using a short length of the tubing, preferably, tubing which will be used in actual field measurement. One end of the tube is plugged, and the other end is connected to a fluid pressure source adjustable over the desired range of pressure, and fitted with an accurate pressure gauge. A typical instrument calibration procedure is used, comparing spring pointer positions or electronic load cell readings with known fluid pressures, and constructing a physical scale in the case of the spring device or a mathematical calibration equation in the case of the electronic device. For most purposes a simple linear relationship is sufficient. The scale and/or pointer can be made adjustable to compensate for manufacturing variation between embodiments or slight variations in tube diameter and wall thickness between different manufacturers. Alternatively, a compensation chart can be used which provides a "correction factor" between the tubing used for calibration and tubing being measured. Calibration may be carried out at static pressure, however, the calibration will still be valid for measuring fluid-containing, resilient tubing wherein the fluid is flowing through the tubing, e.g., irrigation tubing, as long as the velocity of the flow is low, as described, below, in the Calibration and Example sections.

The embodiments of the apparatus of the invention can be constructed with adjustable plate spacing to accommodate different diameters of tubing. The prototypes described below were designed to measure pressure in the most common type of drip irrigation tubing, but overall dimensions and spring strength can be changed to accommodate different types and sizes of tubing and the desired pressure range. It is to be understood that this invention is not limited to the specific exemplary embodiments, but may be used by those of skill in the art for use to measure fluid pressure in other resilient tubing.

The exemplary devices discussed in detail below would be particularly useful for drip irrigation farmers much like pressure gauges are used by sprinkler irrigators to check pressures at different points within their systems. No comparable device has been available heretofore for convenient testing of drip systems. The mechanical spring device intended for field use by farmers can be manufactured at relatively low cost (material cost approx. $10) and could be sold on the commercial market for $50 or less. The low cost and convenience make this device suitable for widespread use. The device is adaptable for other industries or processes wherever thin-walled tubing is used, and the devices may be constructed to accommodate almost any size tubing or pressure range. The range of pressures measured depends only on the pressure rating of the tubing and flexibility of the tube walls.

The invention also encompasses methods of use of the apparatus of the invention for measuring pressure in resilient tubing by measuring the force to compress the tubing. The method comprises:

(a) compressing a section of fluid-containing, resilient tubing between first and second opposed members to a predetermined distance, and (b) measuring the force exerted by the fluid-containing, resilient tubing against the members when the members are at the predetermined distance from one another; wherein the measuring means has been pre-calibrated, at the predetermined distance, to correspond to fluid pressure within the tubing.

Principles and Design

Figure 8A:
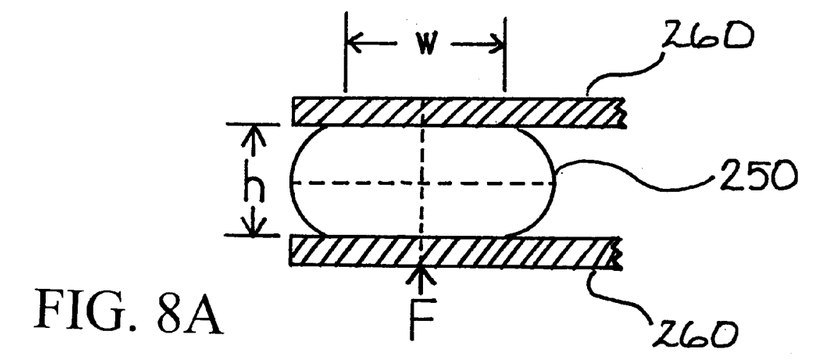
FIG. 8A shows a cross sectional side view showing the first and second members (260) in the closed position wherein the resilient tubing (250) is compressed therebetween.
Figure 8B:
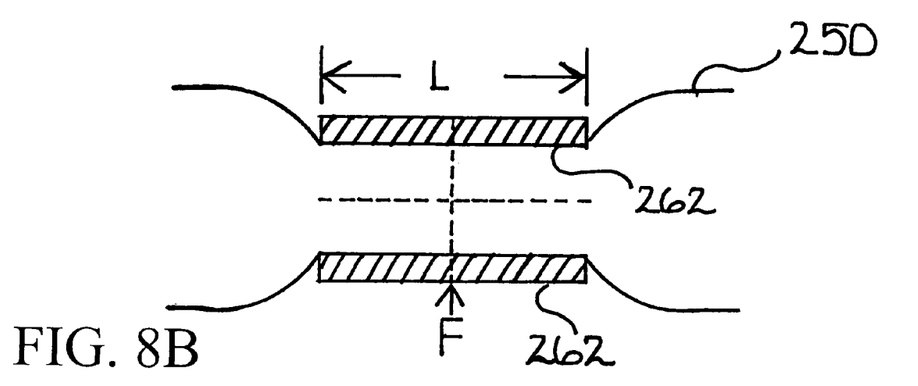
FIG. 8B shows a cross-sectional end view wherein the first and second members (262) are squared-edged with tubing 250 compressed therebetween.
Figure 8C:
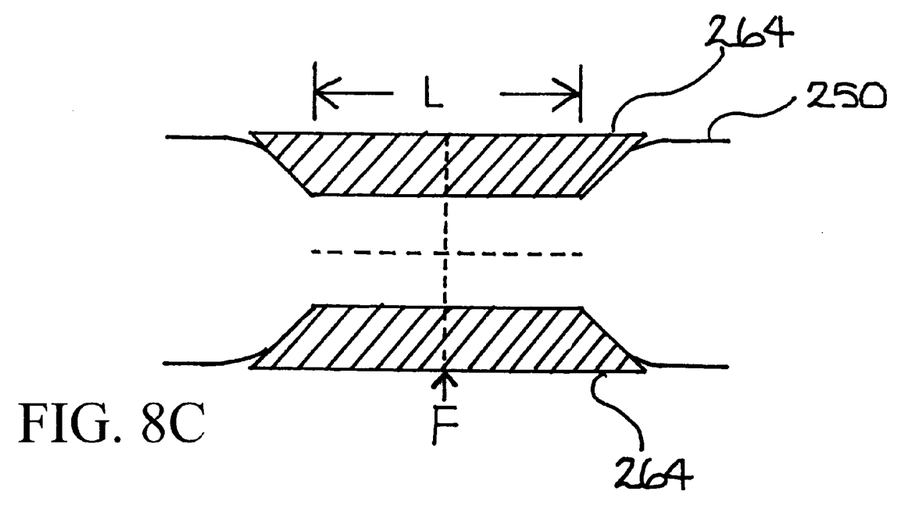
FIG. 8C shows a cross-sectional end view wherein the first and second members (264) are bevel-edged with tubing 250 compressed therebetween.

The device compresses or partially flattens a short section of inflated fluid-containing, circular resilient tubing to sense the pressure within the tube. The device measures the force required to compress the tube by a standard, repeatable amount between, preferably, two substantially parallel plates. The pressure is the product of this force and the area of tube contacting one of the plates. It is important to avoid excessive flow restriction, because the resulting increased flow velocity will reduce the piezometric pressure being measured (calculated by Bernoulli's equation). FIG. 8A–8C shows the plates and compressed tube and the parameters involved. Neglecting the tube wall thickness and elasticity, the plate force can be calculated as $$F=PLw \quad (1)$$

and $$w=d(1-h_r)\pi/2 \quad (2)$$

therefore $$F=CPLd(1-h_r)\pi/2 \quad (3)$$

where
- F is the force, N (lb), required to compress the tubing to the distance h
- w is the width of the tubing contacting the plate m(in)
- P is piezometric pressure in the tube, kPa (psi)
- L is length of tube compressed, m (in)
- d is tube diameter, m (in)
- h is the distance between the plates
- $h_r$ is the compression ratio (h/d), and
- C is a coefficient=1.0 for English and 1000 for metric units.

Equations 1–3 are approximate because they neglect the effect of the tension in the tube wall at the upstream and downstream edges of the plate, which tends to increase the force. Thus, the effective length is slightly greater than the plate length, L. The plate edges can be beveled (FIG. 8C) to eliminate a sharp bend in the tube wall, and reduce the head loss through the contraction. The force, and thus the potential sensitivity increases as the tube is compressed ($h_r$ decreases). However, as the tube is compressed, the cross-sectional area of flow decreases by $$A_r=h_r(2-h_r) \quad (4)$$

where $A_r$ is the ratio of the area in the compressed section to the full circle area.

As the area decreases, the velocity head increases, and the piezometric head decreases (by a facto=$1/A_r^2$). Typical drip laterals are designed to limit flow velocities to about 1 m/s (3 ft/sec) to limit friction losses, yielding a velocity head of about 0.7 kPa (0.1 psi). At $h_r$=0.5, the velocity head increases by a factor of 1.8, to about 1.4 kPa (0.2 psi). At a typical operating pressure of 70 kPa (10 psi), this velocity head effect would be negligible.

Another concern is the pressure loss due to contraction and expansion of the flow. At $h_r$=0.5 the contraction loss is about 5 percent of the velocity head in the contraction, and the expansion loss can be estimated by (H. Rouse, 1946, *Elementary Mechanics of Fluids*, John Wiley and Sons, N.Y.).

$$H_L=H_v(1-A_r)^2 \quad (5)$$

where $H_v$ is the velocity head in the contraction

With $h_r$=0.5, $H_v$=1.4 kPa, $A_r$=0.75 and $H_L$=0.06×0.2=0.08 kPa. Thus, the effects of headloss should be negligible at $h_r$>=0.5. Smaller compression ratios would give better sensitivity to pressure, but will cause some error at higher flows. Thus, we recommend compressing the tube to approximately one half its original diameter. The desired sensitivity or compressed area can be obtained by simply increasing the compressed length. We recommend a compressed length, L, of 2 to 3 times the tube diameter to reduce the end effects and obtain a linear response to pressure.

EXAMPLE

The following example is intended only to further illustrate the invention and is not intended to limit the scope of the invention which is defined by the claims.

Construction of Two Prototypes

Two methods of measuring the force were used in prototype devices. The device was also designed to compress a resilient tube to a constant, repeatable distance between the plates, have easily opened jaws, and to be easily adjustable.

A spring balance device was developed as a low cost field unit (FIGS. 1–5). An ell-shaped scissors type arrangement was used with the compression plates on one side of a pivot and the spring balance on the other side. In the preferred embodiment, the spring is compressed until the plates are substantially parallel and the pressure force is balanced by the spring force. Levers are provided to open the plates while the tube is positioned between the plates. The levers are released and the wingnut is then adjusted until the alignment indicator shows that the plates are parallel (FIG. 5). As the wingnut is adjusted, the spring length changes and the pointer bar moves relative to the pressure scale. A linear scale calibrated in pressure units measures the spring length, and thus the spring force and fluid pressure.

The compression springs used in the prototype had an outside diameter of 32 mm (1.25 inches), a free length of 100 mm (4 inches), and a wire diameter of 2 mm (0.08 inches). The length of the lever arm of the device (vertical height) was designed to accommodate this spring. The lever arm length can be changed and the scale adjusted to utilize different springs. To accommodate different tubing sizes, the plate spacing, lever arm, or length of the plates (compression length) can be changed. The exemplary device was sized for 16 mm (⅝ inch) diameter tubing, and was constructed primarily from 38 mm×4.8 mm (1.5×³⁄₁₆ inch) flat steel bar stock. The cost of materials to build the spring balance prototype was less than $10.

An electronic load cell provided an accurate and reliable laboratory test unit (FIG. 7). In this unit, the plates are opened by rotating the pivoting lever to raise the upper plate while the tube is positioned between the plates. As the levers are squeezed together, the upper plate is forced downward by the load cell until the pivoting lever contacts a preset stop, where the plates are parallel. The load cell output device then displays a reading. The load cell we used was an Interface model SML (www.interfaceforce.com, INTERFACE, Scottsdale, Ariz., $295) with a full scale capacity of 113 N (25 lb). The output was read with a Campbell Scientific 21X data logger. This unit, although more expensive than the spring balance, was useful as a laboratory test device to evaluate the potential accuracy of the method.

Test Results and Discussion

A series of lab tests were conducted to test the effect of different resilient tube wall thicknesses, manufacturers, etc., on the calibration, and determine the accuracy and optimum configuration of the devices. The 16 mm (⅝ inch) diameter tubes were used in these tests. Short lengths of tube were pressurized with air. The load cell device was first calibrated in force units. Using tubes from one manufacturer, we tested the effect of tube wall thickness (4–10 mil=0.1–0.25 mm) and plate length (20 and 40 mm) on the response curve. The output was found to be practically linear from 13.8 to 138 kPa (2 to 20 psi), with either plate length. Theoretical forces calculated by equation 3 indicated that the actual force was approximately 30 percent greater than the theoretical force because of the tension in the tube wall upstream and downstream of the plate edges. The force increased slightly with tube wall thickness at a given pressure. Tubes from a number of different manufacturers were also tested. These tests indicated that there is enough difference due to wall thickness or variation in diameter from different manufacturers that, for best accuracy, it is preferred that the apparatus is calibrated with the tube that will be used in the field. Alternatively, a correction chart can be used to correct for differences due to wall thickness or variation in diameter of resilient tubing from different manufacturers.

The load cell device tests were also conducted with water flowing in the tubes, at a constant piezometric pressure of 69 kPa (10 psi). As the flow velocity increased from 0 to 1 m/s, the load cell force decreased about 3 percent. A further increase in velocity to 2 m/s resulted in a 15 percent decrease in force. This decrease is larger than would be predicted by the velocity head, and is likely due to the curvature of the flow at the contraction.

Calibration and Use of the Prototypes

The prototypes were calibrated by using a short length of tube pressurized with air or water, with an accurate pressure gage to measure the supply pressure. There is normally no need to calibrate the devices for force units. The spring device was calibrated using the Nelson Pathfinder 8 mil tubing. A pressure scale of the proper length as shown in FIG. 5. was constructed, and clamped under a sheet of clear plexiglass. This allowed the scale to be adjusted laterally to "zero" the scale at the midrange of pressure. Alternatively, the pointer could be made adjustable. A linear scale reading in psi was constructed to read accurately between 4–16 psi. When this same scale was used for other manufacturer's tubing, and adjusted to read accurately at 10 psi, small error (5%) occurred at the high and low ends of the pressure range. Thus, if higher accuracy is required, the scale length (slope of the calibration) may need to be changed for different types of tube.

It is understood that the foregoing detailed description is given merely by way of illustration and that modification and variations may be made within, without departing from the spirit and scope of the invention.

What is claimed is:

1. An apparatus for measuring pressure of fluid in fluid-containing, resilient tubing, comprising:
    (a) first and second opposed members for receiving fluid-containing, resilient tubing therebetween;
    (b) compression means for moving at least one of said members towards the other to a predetermined distance therebetween, wherein at said predetermined distance the fluid-containing, resilient tubing is compressed and partially flattened; and
    (c) means connected to at least one of said members to measure the force exerted by the fluid-containing, resilient tubing against said members when said members are at said predetermined distance from one another; wherein said measuring means has been pre-calibrated, at said predetermined distance, to correspond to fluid pressure within the fluid-containing, resilient tubing.

2. An apparatus for measuring pressure of fluid in fluid-containing, resilient tubing, which comprises:
    (a) first and second opposed members being displaceable from one another a distance effective for receiving fluid-containing, resilient tubing therebetween;
    (b) means for displacing one member relative to the other member under application of a first applied force a distance effective for receiving the fluid-containing, resilient tubing therebetween;
    (c) compression means for applying a resistance force effective for moving said first and second members towards one another to a predetermined distance therebetween, wherein at said predetermined distance the fluid-containing, resilient tubing is compressed and partially flattened;
    (d) gauge means connected to at least one of said opposed members for indicating fluid pressure in said fluid-containing, resilient tubing as a measure of the force exerted by the fluid-containing, resilient tubing against said members when said members are at said predetermined distance from one another and in absence of said first applied force; wherein said gauge means has been pre-calibrated, at said predetermined distance, to correspond to fluid pressure within the fluid-containing, resilient tubing.

3. The apparatus of claim 2 which further includes means for adjusting alignment of the first and second opposed members.

4. The apparatus of claim 2 which further includes means for alignment of said tubing between the first and second opposed members.

5. An apparatus, comprising:
    (a) a first plate and a second plate for compressing a fluid-containing, resilient tube to a predetermined, repeatable distance;
    (b) means for opening a space between said plates a distance effective to position and align the tube prior to compressing;
    (c) compression means for moving said plates to said predetermined, repeatable distance, wherein at said predetermined, repeatable distance said resilient tube is compressed and partially flattened; and
    (d) means connected to at least one of said plates for measuring the force exerted by the tube on said plates; wherein said measuring means has been pre-calibrated to correspond to fluid pressure within the tube.

6. The apparatus of claim 5 wherein said plates are substantially parallel at said predetermined, repeatable distance.

7. A method for measuring pressure in fluid-containing, resilient tubing, comprising:
    (a) compressing a section of fluid-containing, resilient tubing between first and second opposed members to a predetermined distance, and
    (b) using measuring means to measure the force exerted by the tubing against said members when said members are at said predetermined distance from one another; wherein said measuring means is attached to at least one of said members and has been pre-calibrated, at said predetermined distance, to correspond to fluid pressure within the tubing.

8. The apparatus of claim 1, wherein the compression means is a compression spring.

9. The apparatus of claim 1, wherein the compression means is a mechanical lever system.

10. The apparatus of claim 2, wherein the compression means is a compression spring.

11. The apparatus of claim 2, wherein the compression means is a mechanical lever system.

12. The apparatus of claim 5, wherein the compression means is a compression spring.

13. The apparatus of claim 5, wherein the compression means is a mechanical lever system.

* * * * *